US007616664B2

(12) United States Patent
Wakid

(10) Patent No.: US 7,616,664 B2
(45) Date of Patent: Nov. 10, 2009

(54) SYSTEM AND METHOD OF SENDING VIDEO AND AUDIO DATA OVER A NETWORK

(75) Inventor: Shukri A. Wakid, Gaithersburg, MD (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 702 days.

(21) Appl. No.: 11/061,357

(22) Filed: Feb. 18, 2005

(65) Prior Publication Data

US 2006/0187962 A1 Aug. 24, 2006

(51) Int. Cl.
*H04J 3/24* (2006.01)
(52) U.S. Cl. ...................................... 370/474
(58) Field of Classification Search .......... 370/412–416
See application file for complete search history.

(56) References Cited

U.S. PATENT DOCUMENTS

| 6,181,706 | B1* | 1/2001 | Anderson et al. ........... 370/412 |
| 2007/0076623 | A1* | 4/2007 | Aloni et al. ................. 370/252 |

FOREIGN PATENT DOCUMENTS

| EP | 1045562 | 10/2000 |
| EP | 1093259 | 4/2001 |
| JP | H05236021 | 9/1993 |
| JP | H09191310 | 7/1997 |
| JP | 2000349812 | 12/2000 |
| JP | 2002314596 | 10/2002 |
| JP | 2003250133 | 9/2003 |
| JP | 2004247818 | 9/2004 |

OTHER PUBLICATIONS

F. Duran et al., "Modeling Access Networks for Quality of Service," 1st IEEE European Conference on Universal Multiservice Networks, ECUMN 2000, Oct. 2-4, 2000, 7 pp.
T. Lizambri et al., "Performance Effects of Voice and Data Convergence," Journal of Network & Systems Management, vol. 9, No. 2, Jun. 2001, 11 pp.
T. Lizambri et al., "Strategies for TCP that can Improve Multimedia Services," Proceedings of the IASTED International Conference (IMSA2000), Nov. 2000, 6 pp.
T. Lizambri et al., "TCP Throughput and Buffer Management," Proceedings of the 3rd IEEE International Symposium on Object-oriented Real-time Distributed Computing Mar. 15-17, 2000, 12 pp.
T. Lizambri et al., "Implementation Guidelines for Internet Based Multimedia Services," Proceedings of the IASTED International Conference (IMSA2000), Nov. 2000, 5 pp.

(Continued)

*Primary Examiner*—Chirag G Shah
*Assistant Examiner*—Otis L Thompson, Jr.

(57) ABSTRACT

A system and method of sending video and audio data over a network. At least some of the illustrative embodiments may be a method comprising writing at least a portion of encoded video data and accompanying encoded audio data to a first buffer (the first buffer accumulating payload of a first datagram), writing transactional data to the first buffer, running a timer simultaneously with the writing, ceasing writing transactional data to the first buffer the earlier of when the first datagram payload meets a predetermined size or the expiration of the timer after a predetermined time, and then sending the first datagram over a network.

25 Claims, 3 Drawing Sheets

OTHER PUBLICATIONS

T. Lizambri et al., "The Best Case for TCP Management," Journal of Network & Systems Management, vol. 8, No. 4, Dec. 2000 issue, 7 pp.

Bruce Thompson, Cisco Systems: "Tunneling Multiplexed Compressed RTP (TCRTP); IETF Standard-Working-Draft, Internet Engineering Task Force, IETF, CH, vol. avt, No. 8, Sep. 2004.

* cited by examiner

SYSTEM AND METHOD OF SENDING VIDEO AND AUDIO DATA OVER A NETWORK

BACKGROUND

There has recently been a convergence of functionality as between cellular telephones, personal digital assistants (PDAs), and still and motion video cameras. The convergent devices give rise to several types of data services with different quality-of-service requirements associated with computer network transmission. For example, motion video and corresponding audio streams, while able to tolerate packet loss without replacement during transmission, are severely affected by long data transmission delays. Financial data streams (e.g., online banking, online bill paying and online purchases) are tolerant to packet loss (with replacement) during transmission, but are not sensitive to transmission delays. Finally, data streams such as electronic mail messages and web services are tolerant to both packet loss (with replacement) and long delays.

Convergent devices thus need to be able to simultaneously handle these different types of services.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an electrical connection via other devices and connections.

Moreover, in the following discussion and in the claims, the term "simultaneously" means simultaneously, or substantially simultaneously.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
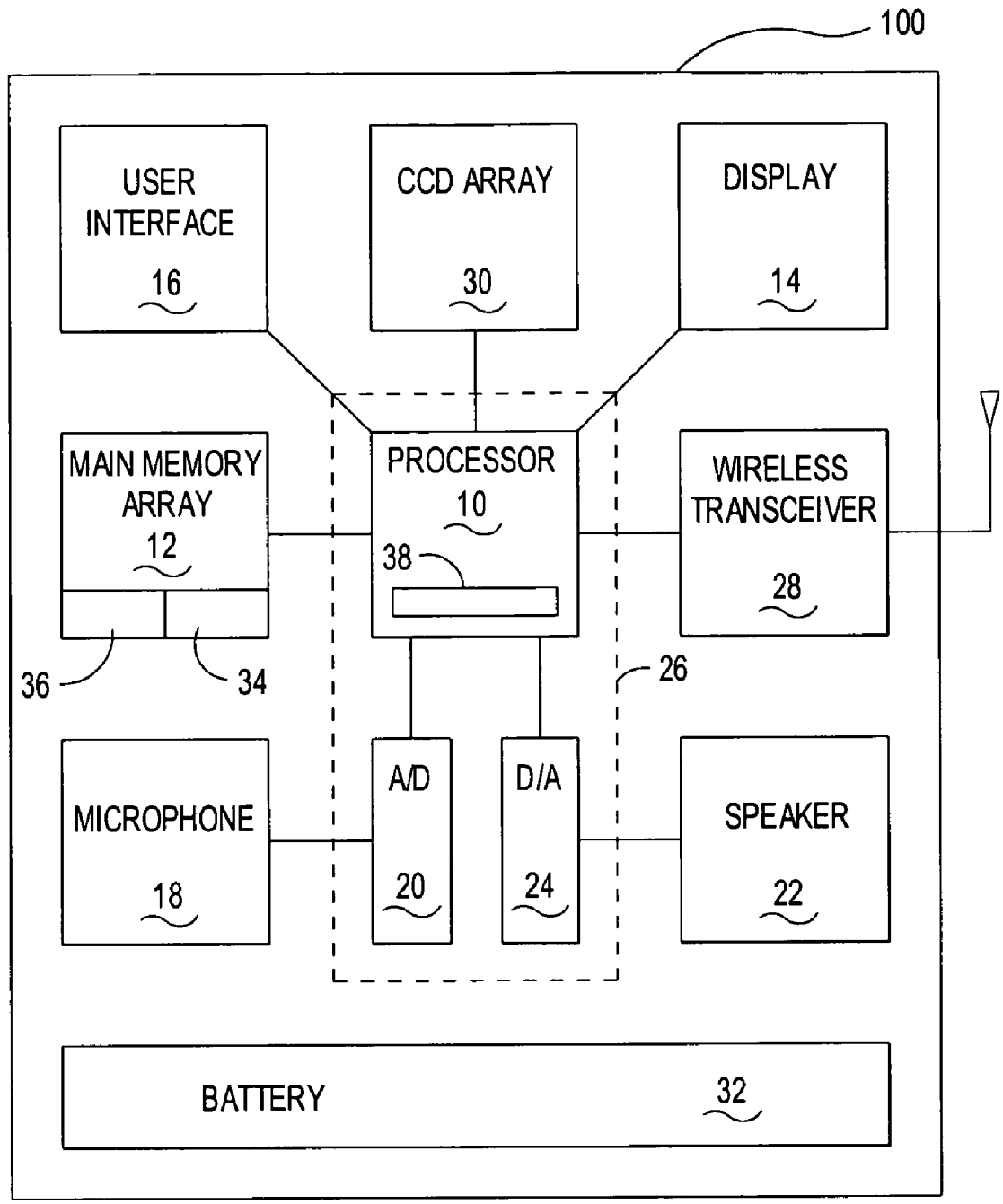
FIG. 1 shows a portable computing system in accordance with embodiments of the invention.

FIG. 1 shows a portable computing device 100 in accordance with at least some embodiments of the invention. Portable computing device 100 incorporates into a single device functionality of one or more of a cellular telephone, a personal digital assistant (PDA), and a still and/or motion video camera. To implement this functionality, portable computing device 100 comprises a processor 10 coupled to a main memory array 12. The main memory array 12 comprises one or more random access memory (RAM) devices. The main memory array 12 is the working memory for the processor 10, and thus stores programs and data utilized by the processor 10. In order to provide the various types of functionality, processor 10 executes one or more programs, which may be stored permanently or semi-permanently in the main memory array 12.

In order to provide PDA-type functionality, portable computing device 100 also comprises a display 14 coupled to the processor 10. The display 14 is any suitable device that can display text and/or data for a user, such as a liquid crystal display (LCD). The portable computing device 100 further comprises a user interface 16 coupled to the processor 10. In some embodiments, the user interface 16 is a full- or reduced-size keyboard. In alternative embodiments, the user interface 16 is a keypad comprising at least the ten numeric digits. In yet further alternative embodiments, the user interface is an digitizer panel that overlays the display 14, thus enabling a user to interface with programs on the processor using a writing stylus. In yet still other embodiments, the user interface may be a combination of two or more of the various types of interfaces described. Processor 10, executing a program, may thus provide a user of the portable computing device 100 services such as calendars, task scheduling, and phone and address book services.

Still referring to FIG. 1, portable computing device 100 further provides telephone functionality, and thus comprises a microphone 18 coupled to the processor 10 by way of an analog-to-digital converter 20. Likewise, speaker 22 couples to the processor 10 by way of digital-to-analog converter 24. Spoken voices are detected by the microphone 18 and converted into digital form by the analog-to-digital converter 20. Processor 10, executing a program, encodes the detected audio data using any suitable encoding scheme, such as Code Excited Linear Prediction (CELP). Likewise, processor 10 may receive encoded audio data, and convert the encoded audio data into an unencoded digital format, apply the unencoded digital format audio data to the digital-to-analog converter 24, thus reproducing the audio by way of speaker 22. Processor 10, analog-to-digital converter 20 and digital-to-analog converter 24 may be individual components coupled together to perform the various tasks, or the functionality of the processor, analog-to-digital converter and digital-to-analog converter may be contained in a single device, as illustrated by dashed line 26, such as a dedicated digital signal processor.

The portable computing device 100 may further comprise a wireless transceiver 28 coupled to the processor 10. The wireless transceiver 28 is responsible for wireless communication of data. In some embodiments, the wireless transceiver 28 is a cellular telephone wireless transmitter and is capable of analog and/or digital communications in a cellular telephone network. In alternative embodiments of the invention, the wireless transceiver 28 implements a wireless networking protocol, such as the Institute of Electrical and Electronics Engineers (IEEE) 802.11 wireless communication protocol. In these embodiments, the portable computing device 100 is capable of transmitting voice communications using Internet Protocol (IP) as the network layer protocol, which may be referred to as Voice Over IP (VOIP).

Still referring to FIG. 1, portable computing device 100 further provides digital camera functionality, and thus comprises a charge-coupled device (CCD) array coupled to the processor 10. Processor 10, executing a program, utilizes the CCD array 30 to capture still images and/or a series of still images to capture motion video. Moreover, using microphone 18, the processor 10 may also capture audio that accompanies the motion video captured using the CCD array 30.

Finally, portable computing device 100 also comprises a battery 32 coupled to, and providing power to, all devices within a portable computing device 100. In alternative embodiments, power may be provided from external sources.

The various devices and functionality of portable computing device 100 give rise to several types of data. For example, full motion video captured by the CCD array 30 produces a video data stream that a user may wish to send to other devices, such as for video conferencing capabilities. Likewise, microphone 18, in combination with analog-to-digital converter 20 and processor 10, creates an audio data stream that may accompany the stream of video data captured by the CCD array 30, thus providing a multimedia data stream. As will be discussed more below, the audio and video data stream, or collectively the multimedia data stream, are a high priority data stream in the various embodiments. Somewhat simultaneously with creation of the audio and/or video data stream, a user of the portable computing device 100 may perform online transactions (e.g., online banking, online bill paying or online purchases), and the type of data associated with the online transactions is referred to herein as "transactional data." Inasmuch as the transactional data may be generated substantially contemporaneously with the multimedia data stream, it is desirable in some situations to synchronously send the transactional data to the receiving computing device with the multimedia data stream. In these situations, transactional data appears to be a high priority data stream. In other situations, however, the transactional data does not accompany the audio and/or video data stream, and thus transactional data appears to be a low priority data stream. Finally, a user of the portable computing device 100 may also generate a relatively low priority data stream, such as electronic mail messages and requests for web services. Inasmuch as this low priority data stream need not be synchronously sent with the multimedia data stream and/or the transactional data, this low priority data stream may also be referred to as the "asynchronous data stream." Each of these types of data have different network transmission constraints which affect quality-of-service at the receiving end.

Considering motion video, the human eye perceives continuous motion when the frame changes at least 25 times a second or more. Thus, for video to seem continuous at the receiving end, screen updates are preferably sent at least every ½5th of a second (every 40 milliseconds). Occasional loss of a video frame does not severely impact quality-of-service at the receiving end; however, excessive network transmission delays, e.g., frame updates sent less often than every 40 milliseconds, may result in severe quality-of-service issues at the receiving end. Because frequency of transmission is of greater concern with regard to a video data stream than ensuring each frame arrive at the destination, in accordance with embodiments of the invention the video data stream is digitally sent using Universal Datagram Protocol (UDP) as the transmission layer protocol. UDP does not inherently provide assurance of delivery of each packet (no acknowledgment of data packet receipt, or automatic or triggered resends of data packets) which therefore lowers overall network overhead for a video data stream which does not need such capabilities. In accordance with at least some embodiments of the invention, the video data stream is encoded prior to network transmission using the Moving Pictures Expert Group (MPEG) II encoding scheme. One method of transmitting this encoding scheme is to transmit a main screen refresh frame (the I-frame) and two update frames (the B and P frames), and using the I-frame, B frame and P frame, the receiving device reconstructs the next overall frame in the motion video. Other currently available or after-developed video encoding schemes may be equivalently used together with other methods of transmitting screen updates.

The second data stream of interest is the audio data stream, which may be contemporaneously created with, and therefore accompany, the video data stream. Much like the video data stream, quality-of-service for an audio data stream at the receiving end is not severely impacted by an occasional lost packet, but excessive delays in the network transmission of audio data stream packets may severely impact quality-of-service at the receiving end. For this reason, a portable computing device 100 in accordance with embodiments of the invention sends the encoded audio data stream using UDP as the transmission layer protocol. Also, in some embodiments, the audio data is encoded using CELP as the encoding mechanism, but any currently available or after-developed encoding scheme may be equivalently used.

As mentioned above, transactional data may be contemporaneously created with the multimedia data stream. While network transmission delays do not affect quality-of-service issues with respect to transactional data in most cases, when the transactional data is created contemporaneous with a multimedia data stream, it is desirable that the transactional data not experience significant network transmission delays. In accordance with embodiments of the invention, transactional data is tied to the multimedia data stream for network transmission in most cases. Because quality-of-service for this type of data is severely impacted by loss of data packets, in accordance with embodiments of the invention, transactional data is transmitted using the Transmission Control Protocol (TCP) as the transmission layer protocol. TCP implementations ensure delivery using receiver acknowledgments, automatic resends on time-out, and receiver-triggered resends of data (such as when data corruption occurs during transmission).

The final type of data created by the illustrative portable computing device 100 is asynchronous data. While network transmission delays do not severely affect quality-of-service, lost packets do, and thus much like the transactional data, the asynchronous data is transmitted to the receiving end using TCP as the transmission layer protocol.

Summarizing before continuing, a portable computing device 100 in accordance with embodiments of the invention creates at least four types of data. A video data stream and an audio data stream, collectively a multimedia data stream, that use UDP as the transmission layer protocol. The multimedia data stream is susceptible to quality-of-service issues based on network transmission delays. Transactional data, which uses TCP as the transmission layer protocol, is not inherently susceptible to quality-of-service issues based on network transmission delays, but it may be desirable to transmit the transactional data substantially simultaneously with the multimedia data stream. Finally, the asynchronous data, transmitted using TCP as the transmission layer protocol, is not particularly susceptible to quality-of-service issues based on network transmission delays.

Various embodiments of the invention are directed to processor-based methods, and related systems, for prioritizing the network transmission of the various data streams and data to ensure that, to the extent possible based on bandwidth and transmission network congestion, each of the data streams is sent with sufficient frequency to reduce quality-of-service issues at the receiving end. In particular, the multimedia data stream, comprising the video data and audio data, is given the highest priority, and in accordance with some embodiments of the invention is transmitted at least as often as every 40 milliseconds. To the extent that time and buffer space allow, transactional data is interleaved with the multimedia data. To the extent that time, buffer space and bandwidth of the communication network allow, asynchronous data is also sent within the same illustrative 40 millisecond time span.

In particular, and in accordance with embodiments of the invention, a portable computing device 100 transmits the various types of data to the receiving device using Internet Protocol (IP) as the network layer protocol. Packet messages from each of the various data types form the payload of each IP message, also known as a "datagram." Stated otherwise, UDP-based video data packets, UDP-based audio data packets, TCP-based transactional data packets and TCP-based asynchronous data packets are "wrapped" as an IP network layer packet, and sent to the receiving device. On the receiving end, each message is handled according to its transmission layer protocol.

Referring again to FIG. 1, the main memory array 12 comprises a high priority buffer 34 and a low priority buffer 36. High priority buffer 34 is used to accumulate the payload for an IP datagram comprising the video data stream, the audio data stream, and in some cases the transactional data. At the earlier of expiration of a 40 millisecond timer or the payload of the datagram becoming full, the IP datagram is completed by filling in various portions of the IP header, e.g., destination, the total length and header checksum. The process of completing the IP header may alternatively be referred to as "sealing" the IP datagram. Once sealed, the IP datagram is ready for transmission. Likewise, when time and bandwidth permit, the low priority buffer accumulates payload for another IP datagram (different from the IP datagram in the high priority buffer) for asynchronous data. When time expires, when the payload of the IP datagram of the low priority buffer is full, or when sufficient bytes have been gathered to fully utilize the transmission network bandwidth, the IP datagram in the low priority buffer is sealed and is ready for network transmission. As the high and low priority buffers considered together become full, the low priority buffer accumulates payload for IP datagrams comprising otherwise high priority data streams. In this situation, the creation and sending of IP datagrams for asynchronous data is stalled.

Transmitting the various sealed IP datagrams may involve copying those datagrams from the buffers in the main memory array 12 to a network interface device (device driver), such as wireless transceiver 28. However, network congestion and/or speed of the network connection may limit how fast the wireless transceiver 28 can consume IP datagrams for transmission, and thus the buffers in the main memory array 12 may accumulate several sets of IP datagrams for network transmission. In order to keep track of the utilization of the buffers 34 and 36, as well as to implement the timer mechanism, various embodiments of the invention utilize a register or set of registers, e.g., register 38 of processor 10. In accordance with some embodiments, register 38 may be a 72-bit register with a portion, e.g., 8 bits, implementing the timer function, and with two 32-bit portions, each 32-bit portion storing a value indicative of how much of the overall capacity of its respective buffer is in use. As data is accumulated in the buffers 34, 36, the corresponding portions of the register 38 are updated. Likewise, as IP datagrams are moved to the wireless transceiver 28 for transmission, the space is freed and thus the utilization values are adjusted.

Figure 2A:
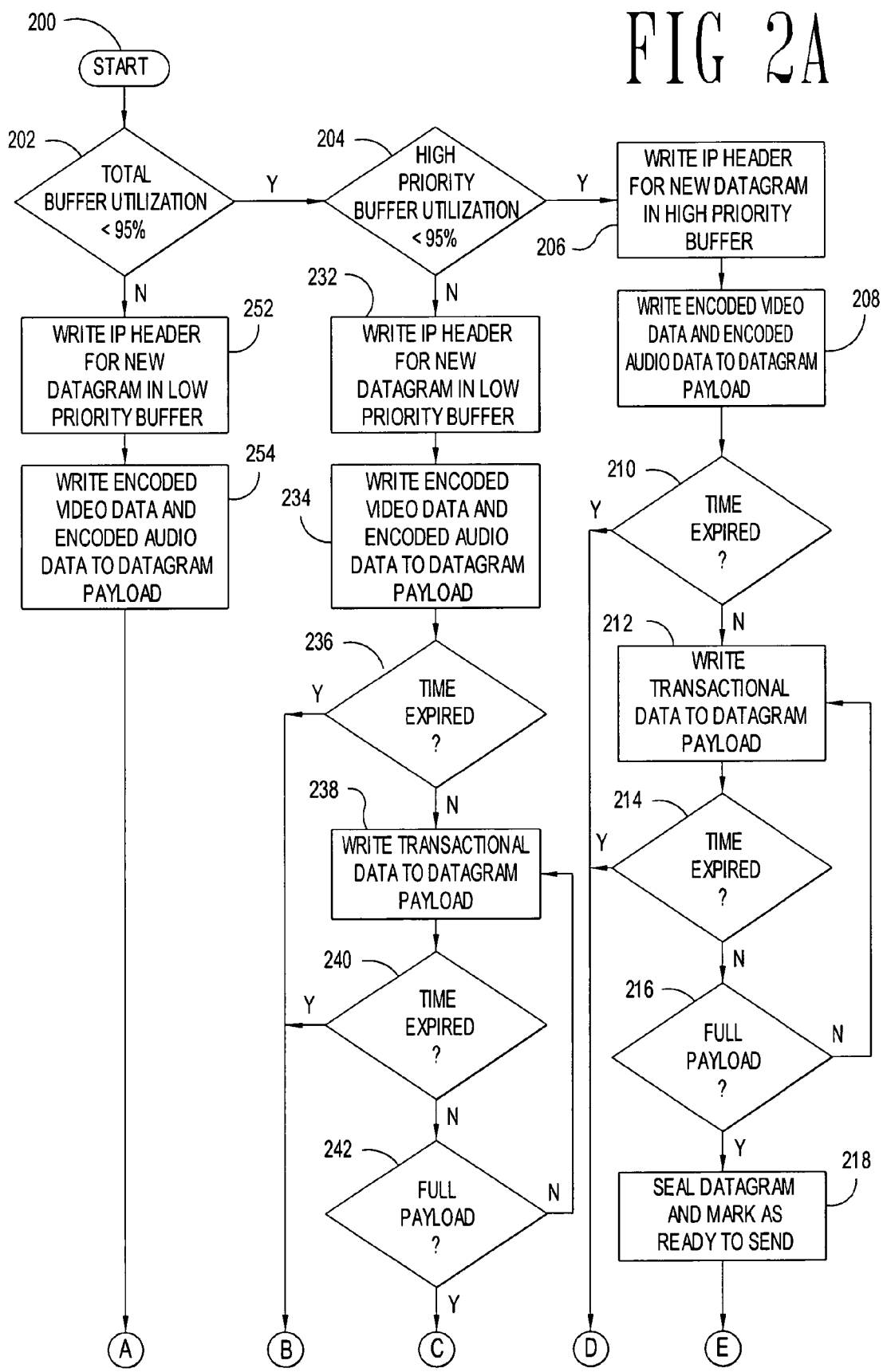
FIG. 2 (comprising FIGS. 2A and 2B) shows a method in accordance with embodiments of the invention.
Figure 2B:
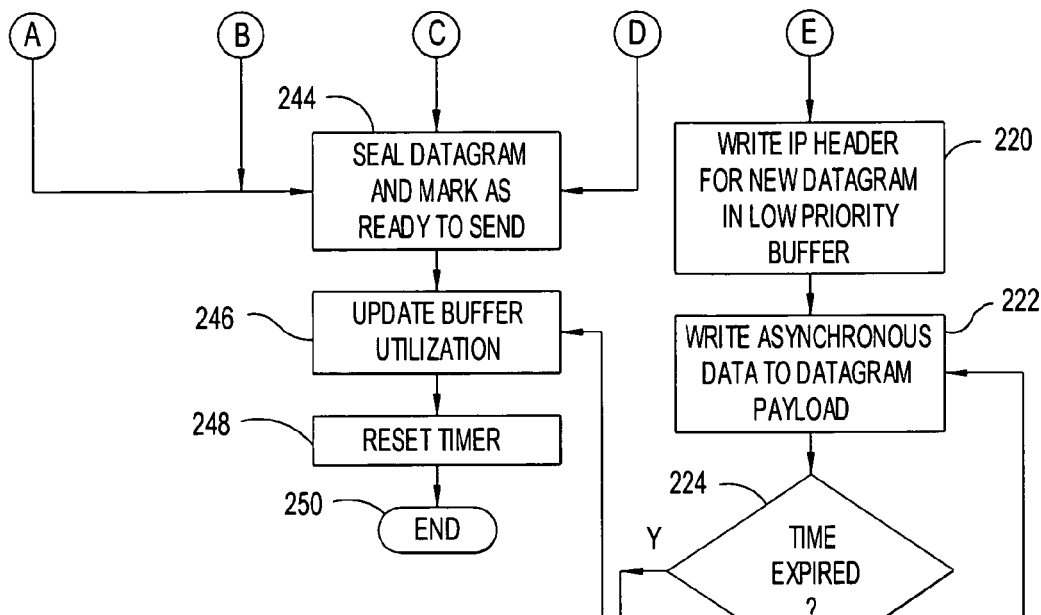

FIG. 2 (comprising FIGS. 2A and 2B) illustrates a method of creating datagrams for network transmission in accordance with embodiments of the invention. In FIG. 2, or any of the figures of the specification, the order of the various illustrative steps may change, some of the illustrative steps may be combined, and others may be separated, all without departing from the scope and spirit of the invention. The process starts (block 200) and moves to a determination of whether the total buffer utilization (both the high priority and low priority buffers considered together) is less than a predetermined threshold (block 202). In some embodiments the predetermined threshold is approximately 95% utilization; however, this threshold may change based on specific system design considerations. If the total buffer utilization is less than the predetermined threshold, a determination is made as to whether the high priority buffer utilization is less than a predetermined threshold utilization (block 204). If the high priority buffer utilization is less than the predetermined threshold, an IP header is written for a new datagram in the high priority buffer (block 206).

An illustrative IP header may contain various pieces of information, some of which may be known at the time the header is initially written, and yet others of which may not be known until later in the process, e.g., total length and header checksum. After writing the IP header, encoded video data and encoded audio data are written to the datagram payload (block 208). In accordance with embodiments where the encoding scheme is MPEG II, writing encoded video data involves writing an I-frame and two update frames (B frame and P frame). The encoded audio data is interleaved with the encoded video data. Thereafter, a determination is made as to whether a predetermined time has expired (block 210), such as by reading a portion of the register 38 within processor 10.

The determination of whether time has expired occurs many times in the illustrative method of FIG. 2, and in each case this determination may be made by reading the portion of register 38 within the processor 10 that stores the timer value. The portion of the register 38 holding the timer value may start at zero and count up, with the time "expiring" when the time reaches a predetermined number. Alternatively, the portion of the register 38 holding the timer value may start at a predetermined number and count down, with the timer "expiring" when the timer reaches zero. Incrementing and/or decrementing the timer value may take place using, for example, a periodic interrupt program. In alternative embodiments, registers outside the processor (like memory registers) may be used to store the timer values and/or the buffer utilization values, and in these embodiments the timer may be incremented and/or decremented by dedicated hardware. Other equivalent methods and systems may be used.

Various embodiments of the invention limit quality-of-service issues based on network transmission delays and associated with audio data streams and video data streams by attempting to transmit audio and video data at least every 40 milliseconds. Thus, if writing the IP header for the new datagram (block 206) and writing encoded video and audio data to the datagram payload (block 208) has taken an amount of time approaching the illustrative 40 milliseconds, there may not be sufficient time to interleave further data. In this case, embodiments of the illustrative method seal the datagram and mark it as ready to send (block 244). Sealing the datagram involves completing portions of the IP header whose values were not known when the IP header was initially written to the high priority buffer (at block 206). Assuming that sealing the datagram (block 244) was based on expiration of the predetermined time, the buffer utilization is updated (block 246). Stated otherwise, the newly written header and payload occupies a certain number of cells of the high priority buffer 34, and this use is noted, such as by increasing the high priority buffer utilization value in the register 38 of the processor 10. The timer is reset (block 248) and the process ends (block 250). In most cases, however, the illustrative method of FIG. 2 is immediately restarted.

Returning to the determination of whether the predetermined time has expired (block 210) after writing encoded video and audio data to the datagram payload (block 208), assuming that the predetermined time has not expired, transactional data is written to the datagram payload (block 212). In accordance with at least some embodiments of the invention, the transactional data uses TCP as the transmission layer protocol, while the video and audio data use UDP as the transmission layer protocol. Thus, the IP datagram carries as a payload both UDP and TCP transmission layer protocol-based messages. After writing transactional data, a determination is again made as to whether the predetermined time has expired (block 214). If the predetermined time has expired, the embodiments of the illustrative process seal the datagram (block 244), update buffer utilization values (block 246) and reset the timer (block 248). If, on the other hand, the predetermined time has yet to expire (again block 214), a determination is made as to whether the IP datagram payload is full (block 216). If the IP datagram payload is not full, then the illustrative process returns to writing more transactional data to the datagram payload (block 212). If the payload is full, the IP datagram is sealed and marked as ready to send (block 218).

An IP datagram maximum size is often 64 kilobytes. If bandwidth of the network to which the illustrative portable computing device 100 of FIG. 1 couples is relatively large, then it is possible to utilize the maximum IP datagram size of 64 kilobytes. If, however, the bandwidth of the network to which the illustrative portable computing device couples is relatively low, the network transmission time associated with a large IP datagram may be too large to be able to send at least one datagram every 40 milliseconds. In these cases the "full" payload size may be reduced.

Still referring to FIG. 2, at this point in the illustrative process the IP datagram in the high priority buffer is full and has been sealed and marked as ready to send. However, time still remains in the predetermined time (as tested at block 214), and thus the illustrative process has time to create a datagram to send low priority asynchronous data. Thus, embodiments of the illustrative process write the IP header for a new datagram in the low priority buffer (block 220). Thereafter, asynchronous data is written to the payload of the datagram in the low priority buffer (block 222). After writing payload data, a determination is made as to whether the predetermined time has expired (block 224). If the predetermined time has expired, embodiments of the illustrative process seal the datagram in the low priority buffer and mark the datagram as ready to send (block 230). The buffer utilization values are updated (block 246), the timer is reset (block 248), and the illustrative process ends (block 250).

If the time has yet to expire (block 224) after writing of the asynchronous data to the datagram payload (block 222), a determination is made as to whether the combined datagram size (sum of the size of the IP datagram in the high priority buffer and the IP datagram in the low priority buffer created in the same predetermined time span) is approaching a bandwidth threshold (block 226). That is, and as discussed above, the bandwidth of the network to which the illustrative portable computing device 100 couples may be such that only a limited number of bytes may be transmitted within any predetermined time, e.g., 40 millisecond, and thus the combined size of the IP datagrams may need to be limited. If the combined size is not approaching the bandwidth threshold (block 226), a determination is made as to whether the payload of the IP datagram in the low priority buffer is full (block 228). If not, the illustrative process returns to writing more asynchronous data to the datagram payload. When the predetermined time expires (block 224), the combined size approaches a bandwidth limit (block 226) or the payload is full (block 228), the IP datagram in the low priority buffer is sealed and marked as ready to send (block 230), buffer utilization is updated (block 246), the timer is reset (block 248), and the process ends (block 250).

The aspects of the illustrative method discussed to this point are used when the total buffer utilization is less than a predetermined threshold (block 202), e.g., approximately 95% utilization, and the high priority buffer utilization is less than a predetermined threshold (block 204), e.g., approximately 95% (or some other value different than used for the combined buffer threshold). If, however, the high priority buffer utilization is greater than a predetermined threshold (again block 204), then the illustrative process continues to produce IP datagrams comprising at least encoded video and audio data, but in this case new creation of a datagram takes place in the low priority buffer. In particular, in this case an IP header for a new datagram is written in the low priority buffer (block 232). Thereafter, encoded video data and encoded audio data are written to the datagram payload (block 234). Much like the illustrative process discussed with regard to building an IP datagram in the high priority buffer, after writing encoded video and audio data a determination is made as to whether the predetermined time has expired (block 236). If the predetermined time has expired, embodiments of the process seal the datagram and mark it as ready to send (block 244). If, on the other hand, the predetermined time has yet to expire, the IP datagram is also populated with transactional data (block 238). After writing transactional data, again a determination is made as to whether the predetermined time has expired (block 240). If the predetermined time has expired, the datagram is sealed (block 244). If the predetermined time has yet to expire, a determination is made as to whether the payload of the IP datagram in the low priority buffer is full (block 242). If the payload is not full, embodiments of the illustrative process return to writing more transactional data to the datagram payload (again block 238). If the payload is full, the IP datagram is sealed (block 244), the buffer utilization values are updated (block 246), the timer reset (block 248), and the process ends (block 250). Thus, in the case of building an IP datagram with video and audio data when the high priority buffer utilization is greater than the predetermined threshold, the IP datagram comprising video and audio data is created in the low priority buffer and, time permitting, may include transactional data. However, in this illustrative case, no attempt is made to create an IP datagram to send the low priority asynchronous data.

Still referring to FIG. 2 (and in particular FIG. 2A), if the total buffer utilization (the combined high and low priority buffer utilization) is greater than a predetermined threshold (block 202), e.g., approximately 95%, embodiments of the illustrative process still create an IP datagram comprising the encoded audio and video data, but the IP datagram does not comprise transactional data, and no attempt is made to create an IP datagram for the asynchronous data. Thus, in this case, an IP header for the new datagram is written in the low priority buffer (block 252), and the encoded video data and encoded audio data are written to the datagram payload (block 254). Thereafter, the datagram is sealed (block 244), the buffer utilization values are updated (block 246), the time reset (block 248), and the illustrative process ends (block 250).

Thus, as buffer utilization increases, the number of IP datagrams created decreases, and also the amount of data carried by each IP datagram decreases. The class of data whose quality-of-service on the receiving end is most highly affected by transmission delays is given the highest priority. Stated otherwise, although several IP datagrams may have been created, because of bandwidth limitations and/or network difficulties, several sealed IP datagrams may remain in the buffers 34 and 36. Thus, as the buffer utilization increases, the number, and thereafter the size, of the IP datagrams decreases so as not to overflow the buffers, and in an attempt to keep the highest priority data stream moving.

Figure 3:
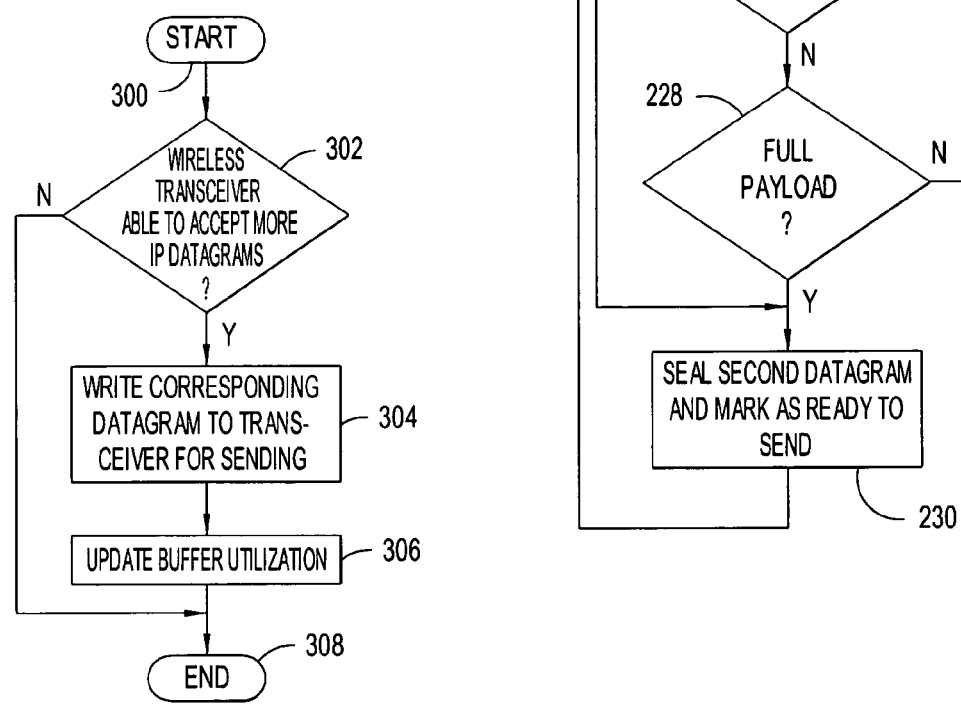
FIG. 3 also shows a method in accordance with embodiments of the invention.

FIG. 3 is an illustrative method that may be implemented to send sealed IP datagrams and update buffer utilization values. In particular, the process may start (block 300) and move to a determination of whether the network interface, e.g., wireless transceiver 28, is able to accept more IP datagrams (block 302). If the wireless transceiver is unable to accept IP datagrams, the process ends (block 308). If, on the other hand, the wireless transceiver is able to accept more IP datagrams for network transmission, the illustrative method writes the corresponding datagrams to the transceiver (block 304). That is, embodiments of the illustrative method move a sealed IP datagram comprising encoded video and audio data from one of the buffers to the wireless transceiver 28. If the IP datagram comprising encoded video and audio data resides in the high priority buffer 34, embodiments of the illustrative method may also write a corresponding datagram comprising asynchronous data from the low priority buffer (if created within the same predetermined time). If, on the other hand, the next IP datagram comprising encoded video and audio data resides in the low priority buffer 36, then no corresponding IP datagram comprising asynchronous data would have been created. Thereafter, embodiments of the illustrative method update the buffer utilization values (block 306). For example, embodiments of the illustrative method may subtract the number of bytes of the one or more IP datagrams copied to the transceiver from the appropriate portion of the register 38 in the processor 10. Thereafter, the process ends (block 308).

From the description provided herein, those skilled in the art are readily able to combine software created as described with appropriate general purpose or a special purpose computer hardware to create a computer system and/or computer subcomponents embodying aspects of the invention, to create a computer system and/or computer subcomponents for carrying out the method embodiments of the invention, and/or to create a computer-readable medium storing a software program to implement method aspects of the various embodiments. Moreover, the embodiments of the illustrative methods could be implemented together in a single program (with various subroutines), or split up into two or more programs executed on the processor. Thus, reference to multiple instances of "a processor, executing a program," in a claim refers to either a single program with multiple subroutines, two or more independent programs, or a combination thereof.

What is claimed is:

1. A processor-based method comprising:
   writing at least a portion of encoded video data and accompanying encoded audio data to a first buffer, the first buffer accumulating the payload of a first datagram;
   writing transactional data to the first buffer;
   running a timer simultaneously with writing the transactional data to the first buffer;
   writing low priority asynchronous data to a second buffer, the second buffer accumulating the payload of a second datagram;
   tracking combined capacity of the first and second buffers;
   refraining from writing low priority asynchronous data to the second buffer, and refraining from writing transactional data to the first buffer, if the utilization of the combined capacity of the buffers reaches approximately 95% or greater;
   ceasing writing to the second buffer the earlier of when: the second datagram payload meets a predetermined size, the combined first and second datagram payloads meed a predetermined size, and the expiration of the predetermined time;
   ceasing writing transactional data to the first buffer the earlier of when: the first datagram payload meets a predetermined size, and the expiration of the timer after a predetermined time; and then
   sending the first datagram over a network.

2. The processor-based method as defined in claim 1 wherein writing encoded video data further comprises writing sufficient encoded video data to at least partially update a frame.

3. The processor-based method as defined in claim 1 further comprising writing the encoded video data to the first buffer using Universal Datagram Protocol (UDP) as a transmission layer protocol.

4. The processor-based method as defined in claim 1 further comprising writing the encoded audio data to the first buffer using Universal Datagram Protocol (UDP) as the transmission layer protocol.

5. The processor-based method as defined in claim 1 further comprising writing the transactional data using Transmission Control Protocol (TCP) as the transmission layer protocol.

6. The processor-based method as defined in claim 1 further comprising sending the second datagram over the network.

7. The processor-based method as defined in claim 1 wherein sending further comprises sending the first datagram using Internet Protocol (IP) as a network layer protocol.

8. A portable computing device comprising:
   a processor;
   a memory coupled to the processor, a first portion of the memory designated as a high priority buffer, and a second portion designated a low priority buffer;
   wherein the processor, executing a program, accumulates payload of a high priority datagram in the high priority buffer until the earlier of when: the high priority datagram payload meets a predetermined size, and the expiration of a predetermined time;
   wherein the processor, executing a program, accumulates payload of a low priority datagram in the low priority buffer if the high priority datagram meets the predetermined size but the predetermined time has yet to expire, and continues to accumulate payload of the low priority datagram until the earlier or when: the low priority datagram payload meets a predetermined size, the predetermined time expires, and a total payload size comprising the high and low priority datagrams reaches a predetermined maximum.

9. The portable communication device as defined in claim 8 further comprising:
   a register operably coupled to the processor, the register comprising a timer portion and a higher priority buffer capacity value portion;
   wherein the processor, executing a program, tracks status of the predetermined time in the timer portion, and capacity of the high priority buffer in the high priority buffer value portion.

10. The portable communication device as defined in claim 9 wherein the processor, executing a program, refrains from writing further low priority datagrams to the low priority buffer, and writes high priority datagrams to the low priority buffer, if the high priority buffer capacity reaches a first predetermined threshold.

11. The portable communication device as defined in claim 10 wherein the first predetermined threshold is at least 95% utilization.

12. The portable communication device as defined in claim 10 further comprising:
the register further comprising a low priority buffer capacity value portion, and wherein the register tracks capacity of the low priority buffer in the low priority buffer value portion;
wherein the processor, executing a program, refrains from writing a portion of the payload of the high priority datagram if the combined capacity of the first and second buffers reaches a second predetermined threshold.

13. The portable communication device as defined in claim 12 wherein the second predetermined threshold is at least 95% utilization.

14. A computer-readable media storing a program that when executed by a processor, causes the processor to:
generate a data stream comprising encoded video data and accompanying encoded audio data;
generate a data stream comprising transactional data;
generate a data stream comprising low priority asynchronous data;
monitor a running timer value;
write at least a portion of the encoded video data, a portion of the encoded audio data, and a portion of the transactional data to a first buffer comprising the payload of a first datagram;
cease writing to the payload of the first datagram the earlier of when: the first datagram payload meets a predetermined size, and the expiration of the timer value;
write at least a portion of the low priority asynchronous data to a second buffer comprising the payload of a second datagram if the first datagram meets the predetermined size but the timer value has yet to expire, and continue to write the second buffer until the earlier of when: the timer value expires, and a total payload size comprising the size of the first and second datagrams reaches a predetermined maximum;
monitor the capacity of the first and second buffers; and if the combined capacity of the first and second buffers reaches a second predetermined threshold
refrain from writing further datagrams in the second buffer comprised of low priority asynchronous data; and
write further datagrams in the second buffer comprising encoded video and audio data, but not transactional data.

15. The computer-readable media as defined in claim 14 wherein when the processor writes, the program further causes the processor to write the encoded video data using Universal Datagram Protocol (UDP) as a transmission layer protocol.

16. The computer-readable media as defined in claim 14 wherein when the processor writes, the program further causes the processor to write the encoded audio data using Universal Datagram Protocol (UDP) as the transmission layer protocol.

17. The computer-readable media as defined in claim 14 wherein when the processor writes, the program further causes the processor to write the transactional data using Transmission Control Protocol (TOP) as the transmission layer protocol.

18. The computer-readable media as defined in claim 14 wherein the program further causes the processor to send the first datagram over a network using Internet Protocol (IP) as a network layer protocol.

19. The computer-readable media as defined in claim 14 wherein when the processor refrains, the program further causes the processor to refrain when the capacity reaches approximately 95% capacity.

20. A portable computing device comprising:
a means for executing instructions;
a means for storing programs and data coupled to the means for executing instructions, a first portion of the means for storing designated a high priority buffer means, and a second portion designated a low priority buffer means;
wherein the means for executing accumulates payload of a high priority datagram in the high priority buffer means until the earlier of when: the high priority datagram payload meets a predetermined size, and the expiration of a predetermined time;
wherein the means for executing accumulates payload of a low priority datagram in the low priority buffer means if the high priority datagram meets the predetermined size but the predetermined time has yet to expire, and continues to accumulate payload of the low priority datagram until the earlier of when: a predetermined time expires, and a total payload size comprising the high and low priority datagrams reaches a predetermined maximum.

21. The portable communication device as defined in claim 20 further comprising:
a register means operably coupled to the means for executing instructions, the register means comprising a timer means and a higher priority buffer capacity value means;
wherein the means for executing tracks status of the predetermined time in the timer means, and capacity of the high priority buffer means in the high priority buffer value means.

22. The portable communication device as defined in claim 21 wherein the means for executing refrains from writing further low priority datagrams to the low priority buffer means, and writes high priority datagrams to the low priority buffer means, if the high priority buffer means capacity reaches a first predetermined threshold.

23. The portable communication device as defined in claim 22 wherein the first predetermined threshold of the high priority buffer means is at least 95% utilization.

24. The portable communication device as defined in claim 22 further comprising:
the register means further comprising a low priority buffer capacity value means, and wherein the register means tracks capacity of the low priority buffer means in the low priority buffer value means;
wherein the means for executing refrains from writing a portion of the payload of the high priority datagram if the combined capacity of the first and second buffer means reaches a second predetermined threshold.

25. The portable communication device as defined in claim 24 wherein the second predetermined threshold of the combined capacity of the first and second buffer means is at least 95% utilization.

* * * * *

UNITED STATES PATENT AND TRADEMARK OFFICE
CERTIFICATE OF CORRECTION

PATENT NO. : 7,616,664 B2 Page 1 of 1
APPLICATION NO. : 11/061357
DATED : November 10, 2009
INVENTOR(S) : Wakid It is certified that error appears in the above-identified patent and that said Letters Patent is hereby corrected as shown below:

In column 10, line 6, in Claim 1, delete "meed" and insert -- meet --, therefor.

In column 10, line 51, in Claim 8, delete "or" and insert -- of --, therefor.

In column 11, line 20, in Claim 14, delete "that" and insert -- that, --, therefor.

In column 11, line 40, in Claim 14, after "write" insert -- to --.

In column 11, line 47, in Claim 14, delete "threshold" and insert -- threshold; --, therefor.

In column 12, line 2, in Claim 17, delete "(TOP)" and insert -- (TCP) --, therefor.

Signed and Sealed this

Sixth Day of April, 2010

David J. Kappos
*Director of the United States Patent and Trademark Office*